United States Patent [19]

Mitschke et al.

[11] 4,212,832
[45] Jul. 15, 1980

[54] PRODUCTION OF HIGH VISCOSITY PHOSPHORIC AND PHOSPHONIC ACID ARYL ESTERS

[75] Inventors: Karl-Heinz Mitschke, Odenthal; Reinhard Schliebs, Cologne, both of Fed. Rep. of Germany

[73] Assignee: Bayer Aktiengesellschaft, Leverkusen, Fed. Rep. of Germany

[21] Appl. No.: 936,987

[22] Filed: Aug. 25, 1978

[30] Foreign Application Priority Data

Sep. 3, 1977 [DE] Fed. Rep. of Germany ....... 2739843

[51] Int. Cl.$^2$ .................................................. C07F 9/09
[52] U.S. Cl. ........................................ 260/930; 260/968
[58] Field of Search ....................... 260/930, 968, 920

[56] References Cited

U.S. PATENT DOCUMENTS

| | | | |
|---|---|---|---|
| 2,290,294 | 7/1942 | Riess et al. | 260/920 X |
| 2,520,090 | 8/1950 | Barrett | 260/930 |
| 4,067,933 | 1/1978 | Wilson, Jr. | 260/920 X |

OTHER PUBLICATIONS

Chemical Abstracts, Abstract of Japanese Kokai 74,118,914, Nov. 13, 1974.

*Primary Examiner*—Anton H. Sutto
*Attorney, Agent, or Firm*—Sprung, Felfe, Horn, Lynch & Kramer

[57] ABSTRACT

A process for the production of a relatively high molecular weight phosphoric or phosphonic acid aryl ester, comprising reacting a phosphoric or phosphonic acid aryl ester with formaldehyde in the presence of sulphuric acid at a temperature from about 10° to 120° C. Advantageously, the aryl ester is of the formula

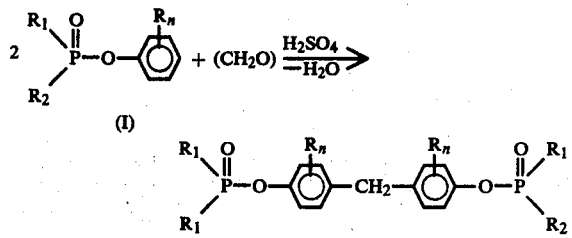

(I)

in which
  R is a hydrogen atom, an alkyl group having from 1 to 6 carbon atoms, a halogen atom, an aryloxy group, or an aryl group;
  $R_1$ is a group $OC_6H_mR_n$ in which m+n=5, an alkyl group, a haloalkyl group or an optionally substituted aryl group;
  $R_2$ is a group $OC_6H_mR_n$, in which m+n=5; and
  n is from 1 to 3, about 0.5 mole of formaldehyde in the form of paraformaldehyde or trioxane is employed per mole of aryl ester, about 1.5 to 2 moles of sulphuric acid are used per mole of aryl ester, the sulphuric acid is employed as a solution of at least about 95% concentration, and the reaction is effected at a temperature of about 40° to 80° C. in the presence of an inert solvent. The products are new and useful as flame-proofing agents in the production of laminated papers and polyesters, as fire-retarding plasticizers in plastics such as PVC, as additives to plastics such as polyphenylene oxides and also as low-flammability hydraulic oils.

4 Claims, 1 Drawing Figure

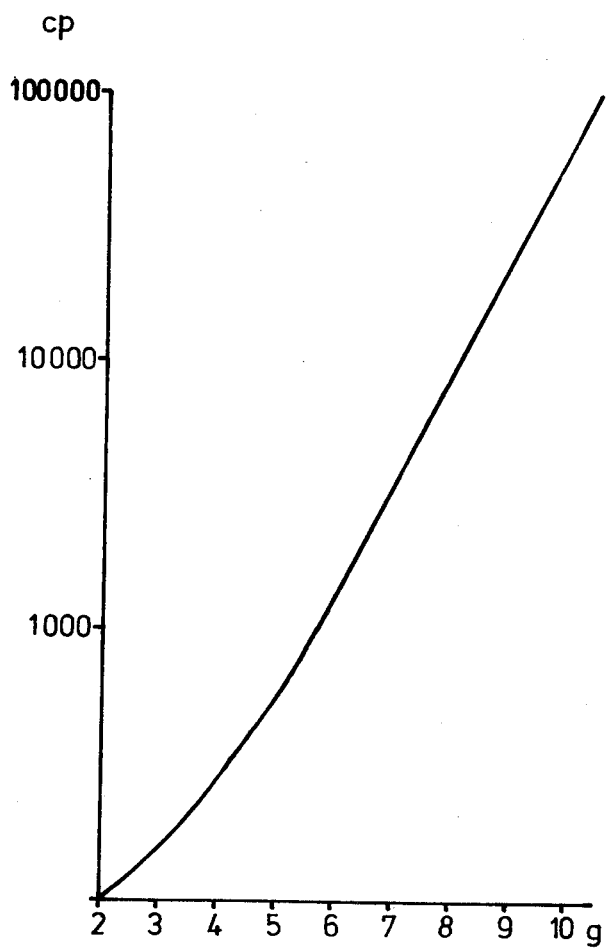

PRODUCTION OF HIGH VISCOSITY PHOSPHORIC AND PHOSPHONIC ACID ARYL ESTERS

The present invention relates to a process for the production of relatively high molecular weight phosphoric and phosphonic acid aryl esters by reacting their corresponding esters with formaldehyde, paraformaldehyde or trioxane in the presence of sulphuric acid.

The aryl esters of phosphoric acids and phosphonic acids (generally aromatic phosphonic acids) are used as flame-proofing agents in the production of laminated papers and polyesters, as fire-retarding plasticizers in plastics such as PVC, as additives to plastics such as polyphenylene oxides, and also as low-flammability hydraulic oils.

Typical examples of aryl phosphates produced on a commercial scale are triphenyl phosphate, diphenyl cresyl phosphate, tricresyl phosphate, isopropylphenyl-phenyl phosphates and, to a lesser extent, nucleus-chlorinated and nucleus-brominated aryl phosphates.

Although these commercially available aryl phosphates generally have a relatively low vapor pressure at room temperature, their considerable volatility is a disadvantage in certain fields of use. In addition, their viscosities are not high enough for certain technical applications, for example the impregnation of filter materials.

There has been no shortage of attempts to produce relatively high molecular weight aryl phosphates or phosphonates. For example by the reaction of benzene phosphonic acid dichloride with bisphenol A (cf. for example Japanese Patent Application No. 49-118, 914), the products obtained in this case containing acid or phenolic terminal groups. Reactions such as these can only be carried out in the presence of acid acceptors because the hydrogen chloride formed would otherwise destroy the bisphenol A.

Similar products are obtained by reacting triaryl phosphates or phosphonic acid diaryl esters with dihydric phenols, particularly bisphenol A. Reactions such as these are carried out by reacting the aryl-(phenyl-) ester with the dihydric phenol at elevated temperatures in the presence of alkaline catalysts, and the monohydric phenol formed is removed by distillation. This transesterification reaction also has various disadvantages such as, for example, the need to remove not only the ester salts formed by the alkaline catalysts but also every trace of monohydric phenol.

The present invention provides a process for the production of relatively high molecular weight phosphoric and phosphonic acid aryl esters, characterized in that phosphoric acid and phosphonic acid aryl esters, optionally dissolved in an inert solvent, are reacted with formaldehyde, paraformaldehyde or trioxane in the presence of sulphuric acid at temperatures of from about 10° C. to 120° C.

It has surprisingly been found that relatively high molecular weight phosphoric and phosphonic acid aryl esters may readily be produced in accordance with the process of the present invention from easily obtainable substances without any of the disadvantages referred to above. In the process according to the present invention, the starting phosphates or phosphonates are attached through methylene bridges, for example as set out in the following general reaction scheme (for one molecule of formaldehyde and 2 molecules of phosphoric acid ester). A corresponding reaction scheme applies to more highly condensed molecules:

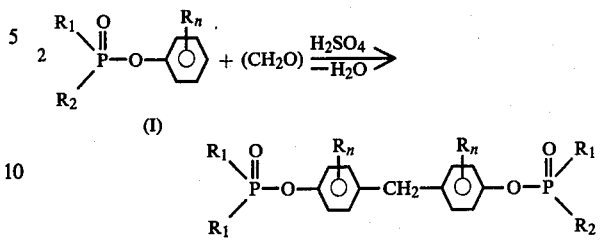

in which
R is a hydrogen atom, an alkyl group having from 1 to 6 carbon atoms, a halogen atom, an aryloxy group, or an aryl group;
$R_1$ is a group $OC_6H_mR_n$ in which $m+n=5$, an alkyl group, a haloalkyl group or an optionally substituted aryl group;
$R_2$ is a group $OC_6H_mR_n$, in which $m+n=5$;
and n is from 1 to 3.

The quantity of formaldehyde or its derivatives may of course be increased beyond the ratio indicated in the reaction scheme. In the case of such a higher ratio, higher molecular weight and, in some cases, crosslinked materials are obtained.

The reaction is statistical, in other words if triaryl phosphates are reacted in such a way that there is one mole of formaldehyde to two moles of triaryl phosphate, the reaction mixture can be expected to contain the following products: unreacted triaryl phosphate, two molecules of triaryl phosphate attached through a methylene bridge and, corresponding to the proportion of unreacted triaryl phosphate, structures of higher molecular weight. Polysubstituted compounds are also possible.

Depending upon the number of methylene bridges introduced, the reaction products obtained are viscous oils, tacky resins or even brittle resins. Even the oils generally have a viscosity of 20° C. of at least about 1000 cP and preferably at least about 5000 cP.

It is particularly surprising that the process according to the present invention can be carried out at all in the form indicated above. Basically, the aryl esters which dissolve exothermically in the sulphuric acid might have been expected to hydrolyze rapidly into phenol and ester acids, or free phosphoric acid or phosphonic acid especially in the presence of the water which is formed, and at the temperatures occurring, during the reaction.

As shown by the yields quoted in the examples hereinbelow, hydrolysis takes place only to a very limited extent, if at all. To this end, however, the ratio of sulphuric acid to aryl ester must exceed a certain minimum ratio. The minimum quantity of sulphuric acid per mole of aryl ester is dependent inter alia upon the ratio of aryl ester to formaldehyde used. It is best to use at least about 1.5 moles of sulphuric acid per mole of aryl ester where 0.5 mole of formaldehyde is used per mole of aryl ester. It is more favorable to use a ratio of, for example, about 2 moles of sulphuric acid to 1 mole of aryl ester. Although larger quantities of sulphuric acid may be used, they afford no particular advantage. The situation is different if the quantity of formaldehyde relative to the aryl ester is increased beyond the above-mentioned value. In this case, it is best to increase the quantities of sulphuric acid substantially proportionally to the quantity of formaldehyde used.

The process according to the present invention is preferably carried out with paraformaldehyde or trioxane as the formaldehyde source. Monomeric formaldehyde may also be used, but it may be too expensive in some cases.

The sulphuric acid used for the process according to the present invention preferably has a concentration of from about 95 to 100%.

It is also possible to use other acids, for example hydrochloric acid, although in that case disadvantages arise (for example the formation of highly toxic intermediate products) which, in many cases, make it appear inadvisable to use acids such as these.

The triaryl phosphates or diaryl phosphonates used are preferably those which can readily be obtained on a commercial scale. These are most preferably triphenyl phosphate, diphenyl cresyl phosphate, tricresyl phosphate, isopropylphenyl-phenyl phosphate, chloroaryl cresyl phosphates, bromoaryl cresyl phosphates, methane phosphonic acid diphenyl ester, methane phosphonic acid phenyl cresyl ester, chloromethane phosphonic acid dicresyl ester, benzene phosphonic acid diphenyl ester and benzene phosphonic acid bis-(dichlorophenyl)-ester.

However, the process according to the present invention is also suitable for other phosphates and phosphonates.

Where solvents are used, those which are stable under the reaction conditions are particularly suitable. Examples of solvents such as these are chlorinated hydrocarbons such as, for example, dichloromethane, dichloroethane, dichloropropane, and tetrachloroethane.

Where the process according to the present invention is carried out continuously, the manner in which the components are introduced into the reaction is preferably manipulated in such a way that all three components are introduced simultaneously. For example, the liquid or molten triaryl phosphate or phosphonate and the sulphuric acid are introduced through metering pumps and the paraformaldehyde through a metering balance. In batch operations and also where the components are premixed, it is important to note the following: whereas the mixture of phosphoric acid or phosphonic acid aryl ester with sulphuric acid is stable over a wide temperature range and, where the formaldehyde is added, reproducible reaction products (as reflected in the viscosity of the end products after working up) are obtained under otherwise identical conditions, it is not the case where the reverse procedure is adopted. If for example the formaldehyde, for instance in the form of paraformaldehyde, is mixed with the sulphuric acid, the mixture initially cools down and subsequently becomes warm. If this mixture is then reacted with the phosphorus component, it is found that the viscosity of the end products depends considerably upon the age of the mixture. The longer the mixture has stood, the lower the viscosity obtained.

Thus, the procedures preferably adopted for the reaction are as follows: mixing all three components at the same time or mixing the acid with the phosphorus compound and adding formaldehyde or mixing the phosphorus conpound and formaldehyde and adding the resulting mixture to the acid or adding the acid to the resulting mixture.

The reaction temperature, which should for example range from about 10° C. to 120° C., is not particularly critical. Although the (slightly exothermic) reaction can take place at or below room temperature, this involves the unnecessary use of energy for cooling. Although temperature above about 100° C. give useful products, those obtained are sometimes heavily discolored. Particularly good results are obtained at temperatures in the range from about 40° C. to 80° C., which is therefore the preferred temperature range.

Although it has been found that the reaction is normally complete less than half an hour after the components have been combined, a reaction time of about 30 minutes to 1 hour would appear to be optimal for practical reasons. However, longer reaction times of, for example, up to about 4 hours are in no way harmful.

The reaction mixture may be worked up in different ways. Where the reaction is carried out in the presence of a solvent, about 100 to 200 ml of solvent, preferably methylene chloride or dichloroethane, is added to the fully reactive mixture per 0.5 mole of phosphorus compound used. Water is then added in such a quantity that two phases are formed (approximately 50 ml per 0.5 mole of phosphorus compound). The organic phase is then washed one or more times with water and then several times with very dilute alkali solution (e.g. sodium hydroxide or bicarbonate). This is followed by washing with deionized water. Finally, the solvent is distilled off, preferably in vacuo.

The relatively high molecular weight triaryl phosphates and diaryl phosphonates obtained may be characterized not only by viscosity measurement or by full analysis, but also by physical-chemical analytical methods.

The accompanying drawing is a plot of the dependence of viscosity upon the triphenyl phosphate/paraformaldehyde ratio. The quantity of formaldehyde per 0.5 mole of triphenyl phosphate is recorded on the abscissa, while the ordinate indicates the viscosity of the reaction product in cP at 20° C. Mass spectrometry is equally suitable, particularly in the case of materials of lower molecular weight. Thus, in the reaction according to Example 1, a molecular weight of 664 is found for the main component.

In the NMR spectrum, it is also possible to determine the number of methylene bridges by counting out the methylene protons (shift position 3.7 to 3.9 ppm) relative to the aromatic protons. Thus, in the case of a bridged triphenyl phosphate for example, the ratio of aromatic protons to the number of protons in the methylene bridge is 15:1, which shows that two triphenyl phosphate radicals are bridged by a methylene group.

The invention is illustrated by the following examples:

| Example No. | Reaction components 1 | 2 | 3 | Input g 1 | mole 1 | g 2 | mole 2 | mole 3 | mole 3 | Reaction temp. °C. | Reaction time h | Initial mixture | Addition of | Viscosity dyn. cP |
|---|---|---|---|---|---|---|---|---|---|---|---|---|---|---|
| 1 | TP | PFA | $H_{SO_4}$ | 163.7 | 0.5 | 7.5 | 0.25 | 150 | 1.5 | 70 | 0.5 | TP/$H_2SO_4$ | PFA | 6 200 |
| 2 | TP | PFA | $H_2SO_4$ | 163 | 0.5 | 7.5 | 0.25 | 75 | 0.75 | 70 | 0.5 | TP/$H_2SO_4$ | PFA | 5 100 |

| Example No. | Reaction components 1 | 2 | 3 | Input g 1 | mole 1 | g 2 | mole 2 | mole 3 | mole 3 | Reaction temp. °C | Reaction time h | Initial mixture | Addition of | Viscosity dyn. cP |
|---|---|---|---|---|---|---|---|---|---|---|---|---|---|---|
| 3 | TP | PFA | $H_2SO_4$ | 163 | 0.5 | 7.5 | 0.25 | 200 | 2.0 | 70 | 0.5 | TP/$H_2SO_4$ | PFA | 5 900 |
| 4 | TP | PFA | $H_2SO_4$ | 163 | 0.5 | 7.5 | 0.25 | 100 | 1.0 | 70 | 4.0 | TP/$H_2SO_4$ | PFA | 5 600 |
| 5 | TP | PFA | $H_2SO_4$ | 163 | 0.5 | 7.5 | 0.25 | 100 | 1.0 | 40 | 2.0 | TP/PFA | $H_2SO_4$ | 5 500 |
| 6 | TP | PFA | $H_2SO_4$ | 163 | 0.5 | 7.5 | 0.25 | 100 | 1.0 | 80 | 0.5 | TP/$H_2SO_4$ | PFA | 5 800 |
| 7 | TP | PFA | $H_2SO_4$ | 163 | 0.5 | 8.5 | 0.28 | 100 | 1.0 | 70 | 1.0 | TP/$H_2SO_4$ | PFA | 11 000 |
| 8 | TP | PFA | $H_2SO_4$ | 163 | 0.5 | 2.5 | 0.08 | 100 | 1.0 | 70 | 1.0 | TP/$H_2SO_4$ | PFA | 1 000 |
| 9 | DPK | PFA | $H_2SO_4$ | 170 | 0.5 | 7.5 | 0.25 | 100 | 1.0 | 60 | 1.0 | DPK/$H_2SO_4$ | PFA | 21 000 |
| 10 | DPK | trioxane | $H_2SO_4$ | 170 | 0.5 | 7.5 | 0.25 | 100 | 1.0 | 60 | 1.0 | DPK/$H_2SO_4$ | trioxane | 21 000 |
| 11 | TKP | PFA | $H_2SO_4$ | 184 | 0.5 | 7.5 | 0.25 | 100 | 1.0 | 60 | 1.0 | TKP/$H_2SO_4$ | PFA | 30 000 |
| 12 | D | PFA | $H_2SO_4$ | 235 | 0.5 | 7.5 | 0.25 | 100 | 1.0 | 50 | 1.0 | D/$H_2SO_4$ | PFA | 72 000 |
| 13 | A | PFA | $H_2SO_4$ | 175 | 0.5 | 7.5 | 0.25 | 100 | 1.0 | 50 | 1.0 | A/$H_2SO_4$ | PFA | 21 000 |
| 14 | B | PFA | $H_2SO_4$ | 185 | 0.5 | 7.5 | 0.25 | 100 | 1.0 | 50 | 1.0 | B/$H_2SO_4$ | PFA | 33 000 |
| 15 | C | PFA | $H_2SO_4$ | 124 | 0.5 | 7.5 | 0.25 | 100 | 1.0 | 50 | 1.0 | C/$H_2SO_4$ | PFA | 3 100 |
| 16 | C | PFA | $H_2SO_4$ | 124 | 0.5 | 15 | 0.5 | 100 | 1.0 | 50 | 1.0 | C/$H_2SO_4$ | PFA | resin |

The symbols used in the Table have the following meanings:
TP = triphenyl phosphate
DKP = diphenyl cresyl phosphate
TKP = tricresyl phosphate
A = phenyl isopropylphenyl phosphate - A (viscosity 90 cP at 20° C., density 1.16)
B = phenyl isopropylphenyl phosphate - B (viscosity 150 cP at 20° C., density 1.13)
C = methane phosphonic acid diphenyl ester
D = partially brominated diphenyl cresyl phosphate containing approximately 29% of Br
PFA = paraformaldehyde.

All the tests summarized in the Table were carried out in a stirrer-equipped apparatus consisting of a 500 ml capacity three-necked flask, a thermometer and a highly effective stirrer.

Working up:
170 ml of methylene chloride are added to the fully reacted crude products. Water (approximately 50 ml) is added to the resulting clear solution until a clouded mixture is formed. The sulphuric acid which separates as the lower phase has a concentration of approximately 60 to 70% by weight. The organic phase is then washed three times with 200 ml of distilled water at room temperature. A little dilute sodium hydroxide is subsequently added to the second wash until a neutral reaction is obtained. The product which is freed from the solvent in vacuo may, if necessary, be filtered through a heatable suction filter. In every case, yields exceed 95% of the theoretical yield. The recovery of acid amounts to between 90 and 95% of the input. The dilute acid may of course, be regenerated.

It will be appreciated that the instant specification and examples are set forth by way of illustration and not limitation, and that various modifications and changes may be made without departing from the spirit and scope of the present invention.

What is claimed is:
1. A process for the production of a relatively high molecular weight phosphoric or phosphonic acid aryl ester, comprising reacting a phosphoric or phosphonic acid aryl ester of the formula

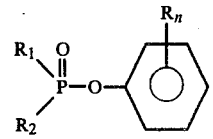

in which
R is a hydrogen atom, an alkyl group having from 1 to 6 carbon atoms, a halogen atom, an aryloxy group, or an aryl group;
$R_1$ is a group of $OC_6H_mR_n$ in which $m+n=5$, an alkyl group, a haloalkyl group or an optionally substituted aryl group;
$R_2$ is a group of $OC_6H_mR_n$, in which $m+n=5$; and
n is from 1 to 3,
with formaldehyde at a temperature of about 10° to 120° C. and in the presence of at least 1.5 moles of sulphuric acid per mole of ester.

2. A process according to claim 1, wherein the formaldehyde is employed in the form of paraformaldehyde or trioxane.

3. A process according to claim 1, wherein about 0.5 mole of formaldehyde in the form of paraformaldehyde or trioxane is employed per mole of aryl ester, about 1.5 to 2 moles of sulphuric acid are used per mole of aryl ester, the sulphuric acid is employed as a solution of at least about 95% concentration, and the reaction is effected at a temperature of about 40° to 80° C. in the presence of an inert solvent.

4. The product produced by the process of claim 3, and having a viscosity at 20° C. in excess of about 5000 cP.

* * * * *